Nov. 17, 1931.      R. R. BLOSS      1,832,686
FLUID COOLED BRAKE DRUM
Filed Oct. 24, 1930

INVENTOR.
RICHARD R. BLOSS
BY W. S. Babcock
ATTORNEYS.

UNITED STATES PATENT OFFICE

RICHARD R. BLOSS, OF COLUMBUS, OHIO, ASSIGNOR TO INTERNATIONAL-STACEY CORPORATION, OF COLUMBUS, OHIO, A CORPORATION OF OHIO

FLUID COOLED BRAKE DRUM

Application filed October 24, 1930. Serial No. 490,946.

The invention to be hereinafter described relates to water cooled brake drums.

In the drawings illustrating the invention a single application only of the invention has been shown—its use on a sand reel for oil well operations. It will at once be obvious that there are many other machines and apparatuses to which the invention is very readily applicable and with which any average skilled mechanic or engineer may easily and quickly combine it. Hoisting drums; cable way drums; drums of logging engines; elevator drums; are a very few of the many applications. On the other hand further illustration by drawings, with an invention as simple as the present, would serve only to defeat the purpose of specifications by beclouding rather than clarifying.

There are a considerable number of cooling systems at present actually in use to a greater or less degree and a much greater number of granted patents relating to or disclosing such systems. And, of course, there is considerable trade literature on the subject. In general, they may all be classed in two large groups—internal and external application of cooling fluid. Those of the internal group are fairly represented by the jacketed constructions in which the flange of the drum is hollow to provide a chamber through which a cooling fluid is passed to conduct away the heat of friction. Those of the external group are fairly represented by constructions in which the cooling fluid is applied from without as by one or more streams, jets or sprays directed against and over the outer face or wall of the inner flange i. e. the surface with which the belt or the like does not contact.

In broad and general terms, the present invention would be classed in the first group. In this group applicant is familiar with disclosures in which there are several brake band rings with a pipe from one ring to the other; others in which each end of a brake drum shaft is provided with a bore, the cooling fluid conducted into and through the bore at one end, piped therefrom to the interior of the flange and piped from the flange to the bore in the opposite end of the shaft; others in which a single shaft carries a plurality of brake drums and is bored out its entire length with dams or plugs at each drum and radial passages or bores at each side of each dam to establish influx and efflux, respectively, to and from the particular drum; and a number of others including a wide variety of those just specifically mentioned.

Among the more serious objections to the constructions heretofore used are the complexity involved in the considerable number of parts in most of them; the difficult construction required in many; the cost in manufacture and maintenance; and the inefficiency in operation.

The main purposes of this invention are to overcome these and many other recognized objections and provide a simple, efficient, compact and economical construction which will have the least practicable number of working parts for production or maintenance cost, while at the same time adequately cooling the brake flange to avoid burning out or over-heating.

In order to more clearly disclose the construction, operations, and use of the invention, reference should be had to the accompanying drawings forming part of the present application. Throughout the several figures of the drawings like reference characters designate the same parts in the various views.

In the drawings:—

Figure 1:
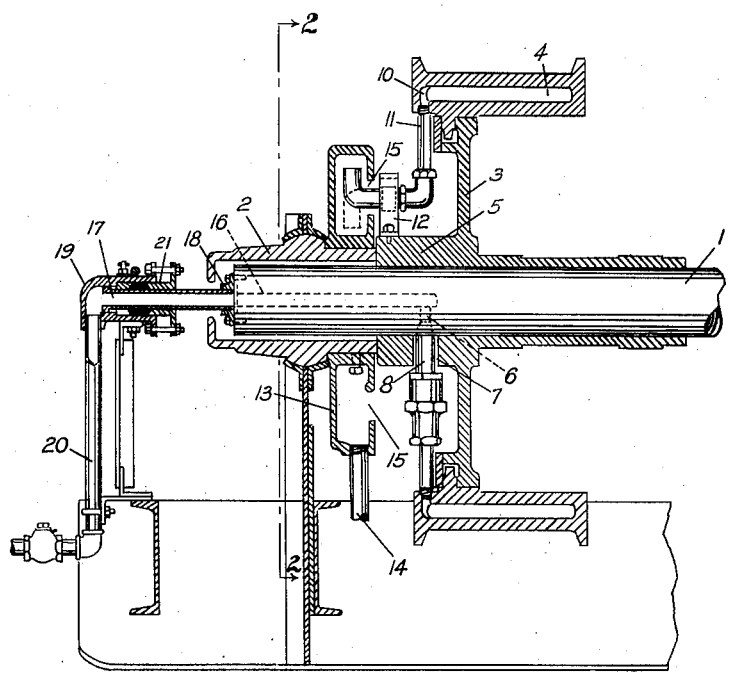
Fig. 1 is a central vertical cross section.
Figure 2:
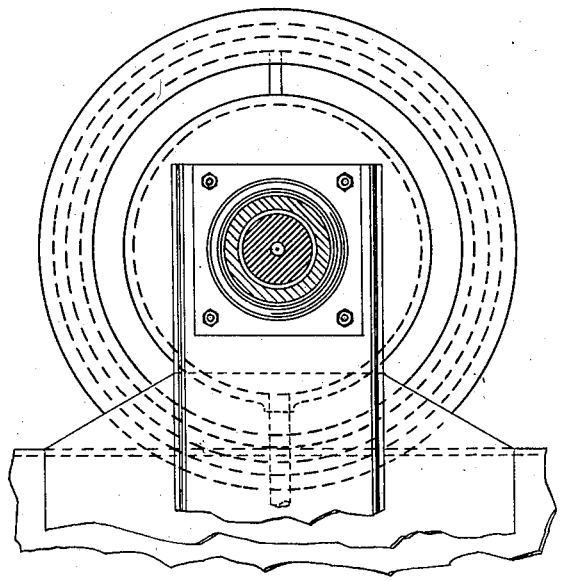
Fig. 2 is a left hand end view of Fig. 1, partly in section, on line 2—2.

Referring to the drawings in detail, 1 indicates the shaft of a sand reel, or other rotating member. It is suitably supported in adequate journals in well known manner. Preferably the supports include self-aligning bearings 2 of well known type. To the shaft is keyed or otherwise secured, to rotate therewith, in any well known manner the brake flange 3 having a jacket or chamber 4 for receipt and circulation of a cooling fluid. In the case of a sand reel, as in Fig. 1, the shaft 1 is bored centrally and longitudinally from the near end to a point beyond the near end of the hub 5 of the flange relative to the seated or operative positions of the brake flange on its shaft. From this longitudinal bore extends a short radial bore or passage 6 which aligns with a similar short bore 7 through the flange hub. A short pipe 8 leads from these aligned bores to a bore 10 through the inner circumferential wall of the jacket or chamber 4. Any suitable connection may be used between the end of pipe and its bore 10. Preferably, the inner end of this pipe is passed through a small sleeve in the bore 7 and then threaded into the correspondingly threaded end of the bore 6. As the drum rotates the fluid will be thrown centrifugally against the inner wall of the braking surface to absorb its heat. It will then pass into and through a U-shaped outlet pipe 11 one end of which is threaded into the brake flange. It should be stated, here, that the brake flange is mounted expansibly relatively to the web or radial member 3 and is not integral therewith. The details of this mounting are clearly disclosed in my Patent 1,696,664 December 25, 1928, to which reference is hereby made. Preferably, pipe 10 is carried by a bracket 12 fixed to hub 5. The intermediate or connecting portion of the U of the pipe extends beyond the end of hub 5. Mounted on the inner end of bearing 2 is an annular trough 13 of substantially rectangular radial cross section, as shown, though other cross sectional shapes may be used. This trough is suitably secured to bearing 2 by bolts, screws or the like and is provided with a drain or outlet pipe 14 leading from its lower end. The wall or face of trough 13 nearest hub 5 is provided with an annular opening or slot 15 for the free passage of the pipe 11. The outer or short leg or branch of pipe 11 extends parallel with the radial walls of the trough and opens toward the outer closed wall thereof at a point between such closed wall and the annular slot or opening 15. It will be noticed, on reference to Fig. 1 there is a short radial wall leading outwardly from the innermost wall of the trough to the edge of the opening 15 and a similar one leading inwardly. This arrangement acts both as a guard against spray and spattering and also as a conduit to lead the outflowing fluid to the pipe 14 from which it may pass to a barrel or other container for continuous recirculation. While one has been shown for inlet and one for outlet it will be understood that more of either may be used. Preferably and usually copper tubing is used to more readily accommodate expansion of the drum flange and its slight resulting radial movements relatively to the web 3, a slight expansion bend being put in any otherwise straight tube, as will be understood.

Aligned with the bore 16 of the shaft 1 is a short inlet or feed pipe section 17 which is provided with a threaded end to be seated in a threaded nut or collar 18 suitably bolted to shaft 1, around the outer end of bore 16, thereby aligning the pipe 17 and bore 16. This pipe is mounted in and supported by a casting 19 which is carried on a bracket or other support of any well known type. Preferably the casting is provided with an elbow in the lower end of which is connected the upper end of a feed or supply pipe 20 leading from a suitable source of supply and suitably supported. Pipe 17, as will be readily understood, is freely revolvable in the casting 19, a suitable packing gland 21 being used in well known manner to make a fairly fluid tight joint.

On reference to Fig. 1 it will be noticed that the end of pipe 11 is shown, in dotted lines, as turned inwardly or toward the shaft 1, for a purpose to be later disclosed.

On careful consideration it will be seen that this construction also comprises a centrifugal pump. Due to the fact that the outlet opening of pipe 11 is at a greater distance from the axis of the drum than is the feed or supply passage 16 there is created, a considerable static pressure and resulting flow to the fluid. As soon as rotation is started the fluid starts to rotate with the drum and centrifugal force causes discharge through pipe 11. The resulting suction within chamber 4 and through the connections 6 and 16 pumps the fluid from its source of supply and through the feed pipe 20 at the same rate, of course, as the discharge. The rate of discharge, feed pressure remaining unchanged, will vary with the variations in centrifugal force. The variations in centrifugal force, drum diameter being constant, depends upon rate of rotation of drum (R. P. M.) and the distance of the outlet of pipe 11 from the axis of the drum. The higher the R. P. M. the greater will be the centrifugal force and the resulting pumping action. The greater the distance of the discharge opening of the pipe 11 from the axis of the drum the greater will be the centrifugal force set up in the fluid, other factors remaining unchanged. Obviously by turning the discharge opening toward the shaft or axis, as in dotted lines, the effective centrifugal force will be reduced. And if the discharge end of pipe 11 is made revolubly adjustable relatively to the rest of the pipe corresponding variations in centrifugal force and pumping effect may be had ranging anywhere between the two radially opposite positions of the outlet end, thereby providing an accurate and simple regulating means of considerable range.

It is thought that the construction, operation and use of the invention will be clear from the preceding detailed description.

Changes may be made in the construction, arrangement and disposition of the various parts within the scope of the appended claims without departing from the field of the invention and it is meant to include all such within this application wherein only one form and application has been shown merely by way of illustrations and with no intention of any limitation.

Having thus described my invention what I claim and desire to protect by Letters Patent is:—

1. In combination, a revolvable shaft, a brake drum carried thereby and revolvable therewith and provided with a fluid receiving cooling chamber, and annular stationary trough provided with an annular opening, and means carried by said brake drum and travelling freely in said opening and adapted to deliver fluid from said brake drum into said trough.

2. In combination, a revolvable shaft, an expansible brake drum carried thereby and revolvable therewith and provided with a fluid receiving cooling chamber, an annular stationary trough, and means carried by said drum and adapted to deliver fluid therefrom to said trough.

3. In combination, a revoluble shaft, a brake drum carried thereby and provided with a fluid receiving cooling chamber, means for delivering a cooling fluid through said shaft to said chamber and an adjustable outlet pipe whereby centrifugal force effective therethrough may be regulated.

4. In combination, a revoluble shaft, a brake drum carried thereby and provided with a fluid receiving cooling chamber, means for delivering a cooling fluid through the centre of said shaft to said chamber, and an outlet pipe leading from said chamber and opening at a considerable distance radially from the centre of said shaft whereby to increase the centrifugal force of the fluid resulting from rotations of the drum.

In testimony whereof, I have affixed my signature.

RICHARD R. BLOSS.